US012624167B2

(12) United States Patent
Zhou et al.

(10) Patent No.: US 12,624,167 B2
(45) Date of Patent: May 12, 2026

(54) CURABLE COMPOSITIONS CONTAINING THIOL COMPOUNDS

(71) Applicant: Arkema France, Colombes (FR)

(72) Inventors: Xinyu Zhou, Guangzhou (CN); Mingxin Fan, Guangzhou (CN)

(73) Assignee: Arkema France, Puteaux (FR)

( * ) Notice: Subject to any disclaimer, the term of this patent is extended or adjusted under 35 U.S.C. 154(b) by 643 days.

(21) Appl. No.: 16/760,131

(22) PCT Filed: Oct. 31, 2017

(86) PCT No.: PCT/CN2017/108523

§ 371 (c)(1),
(2) Date: Apr. 29, 2020

(87) PCT Pub. No.: WO2019/084754

PCT Pub. Date: May 9, 2019

(65) Prior Publication Data

US 2020/0347187 A1 Nov. 5, 2020

(51) Int. Cl.

| | |
|---|---|
| ***C08G 75/045*** | (2016.01) |
| ***C08F 2/50*** | (2006.01) |
| ***C08F 216/12*** | (2006.01) |
| ***C08F 220/40*** | (2006.01) |
| ***C08F 222/10*** | (2006.01) |
| ***C09D 4/00*** | (2006.01) |
| ***C09J 4/00*** | (2006.01) |

(52) U.S. Cl.

CPC .............. *C08G 75/045* (2013.01); *C08F 2/50* (2013.01); *C08F 216/125* (2013.01); *C08F 220/40* (2013.01); *C08F 222/10* (2013.01); *C09D 4/00* (2013.01); *C09J 4/00* (2013.01)

(58) Field of Classification Search

CPC ......... C08G 75/045; C08G 75/00; C08F 2/50; C08F 216/125; C08F 220/40; C08F 220/10; C08F 2/48; C08F 222/103; C08F 2/44; C08F 220/14; C08F 222/1006; C09D 4/00; C09J 4/00; C09J 175/16

See application file for complete search history.

(56) References Cited

U.S. PATENT DOCUMENTS

| | | | | |
|---|---|---|---|---|
| 2002/0004537 | A1* | 1/2002 | Krongauz | C08F 290/147 522/90 |
| 2009/0093564 | A1* | 4/2009 | Oyanagi | C09D 133/04 427/508 |
| 2012/0165498 | A1* | 6/2012 | Kitano | C08G 75/045 528/360 |
| 2013/0146077 | A1 | 6/2013 | Cooke et al. | |
| 2016/0244625 | A1* | 8/2016 | Clapp | C08L 83/06 |
| 2016/0376453 | A1* | 12/2016 | Hearon | B41J 2/01 428/339 |
| 2017/0342238 | A1 | 11/2017 | Ohashi et al. | |

FOREIGN PATENT DOCUMENTS

| | | | | |
|---|---|---|---|---|
| CN | 102144009 A | 8/2011 | | |
| EP | 0810251 A2 * | 5/1997 | | C08G 75/04 |
| GB | 2496990 A * | 5/2013 | | A61K 8/81 |
| JP | 2009086291 A | 4/2009 | | |
| JP | 2015048402 A | 3/2015 | | |
| JP | 2015189851 A | 11/2015 | | |
| WO | 2016104388 A1 | 6/2016 | | |
| WO | 2017064033 A1 | 4/2017 | | |
| WO | 2017157711 A1 | 9/2017 | | |

OTHER PUBLICATIONS

Umino et al, machine English translation of JP 2011-026492 (Year: 2011).*

* cited by examiner

*Primary Examiner* — Jessica M Roswell

(74) *Attorney, Agent, or Firm* — Christopher R. Lewis

(57) ABSTRACT

Provided is a photocurable composition comprising: a) at least one monomer or/and oligomer bearing at least one functional group selected from the group consisting of (meth) acrylate-functional group, vinyl-functional and allyl-functional group or at least one monomer or/and oligomer bearing at least two of said functional groups with one of them being an allyl group, b) at least one polythiol bearing at least one secondary thiol group, and c) at least one photoinitiator. The said composition can be used in coatings, inks, adhesives and varnishes. A finished cured product made of the said composition is suitable for optical, electronic and opto-electronic applications.

18 Claims, No Drawings

CURABLE COMPOSITIONS CONTAINING THIOL COMPOUNDS

CROSS-REFERENCE TO RELATED APPLICATIONS

This application is a U.S. national stage application under 35 U.S.C. § 371 of international application number PCT/CN2017/108523, filed Oct. 31, 2017.

FIELD OF THE INVENTION

The present invention relates to stable compositions of thiol-ene based UV curable polymer used in coatings, adhesives and inks. The composition exhibits good shelf stability, fast curing speed, less susceptible to oxygen inhibition with resulting cured films which exhibit excellent optical clarity, low shrinkage, flexibility, adhesion to a variety of substrates. They are especially suitable for optical and electronic applications, in particular optical lenses, optical adhesives or films or opto-electronic devices and sensors.

BACKGROUND OF INVENTION

The crosslinking of unsaturated polymers through the addition of elemental sulfur was discovered in 1839 by Goodyear. It is used extensively in the tire industry to this day. The application of the thiol-ene reaction are also far ranging, in both polymer and synthetic chemistry. Initiation occurs by radical formation upon UV excitation of a photoinitiator or the thiol itself. The resulting sulfenyl radical subsequently adds to the unsaturated alkene to form a new carbon radical.

A reaction of thiol and a carbon-carbon double bond is known as a thiol-ene reaction.

Typical ultraviolet radiation curable (meth)acrylate materials are known to experience oxygen inhibition when cured. The oxygen inhibition is limited to the surface of the materials. For ultra-thin coating and LED cured ink, the oxygen inhibition becomes a bulk problem as opposed to a surface issue. So the results about cured products exhibit insufficient adhesion to a substrate or insufficient hardness. As is well known, shrinkage can cause unpredictable defect in precise molding operations such as those required in manufacture of optical elements such as BEF (Brightness Enhancement Films). Shrinkage can also create residual stress in such optical film, which can subsequently lead to optical defects including high birefringence.

SUMMARY OF THE INVENTION

The present invention relates to a photopolymerizable composition comprising:

a) at least one monomer or/and oligomer bearing at least one functional group selected from the group consisting of (meth)acrylate-functional group, vinyl-functional and allyl-functional group or at least one monomer or/and oligomer bearing at least two of said functional groups with one of them being an allyl group, b) at least one polythiol bearing at least one secondary thiol group, and c) at least one photoinitiator.

The composition can be made free of solvent and can be rapidly photocured. When cured, the composition exhibits low shrinkage and excellent optical and electronic performances. It is suitable for many optical applications such as optical lenses, optical adhesive and optical film.

BRIEF DESCRIPTION

The present invention relates to a thiol-ene photocurable composition that is used in UV cured system with excellent flexibility, low shrinkage, adhesion, less susceptible to oxygen inhibition and hardness.

A first subject of the invention relates to a photocurable composition comprising a) at least one monomer or/and oligomer bearing at least one functional group selected from the group consisting of (meth)acrylate-functional group, vinyl-functional and allyl-functional group or at least one monomer or/and oligomer bearing at least two of said functional groups with one of them being an allyl group, b) at least one polythiol bearing at least one secondary thiol group, and c) at least one photoinitiator.

A second subject of the invention relates to the use of said photocurable composition in coatings, inks, adhesives and varnishes.

Another subject of the present invention relates to a finished product resulting from the cure of at least one photocurable composition according to the present invention.

Finally the invention does also cover the use of said finished product for optical or electronic or optoelectronic applications.

DETAILED DESCRIPTION

The first subject of the invention relates to a photocurable thiol-ene composition which comprises:

a) at least one monomer or/and oligomer bearing at least one functional group selected from the group consisting of (meth)acrylate-functional group, vinyl-functional and allyl-functional group or bearing at least two of said functional groups one of which is an allyl group, b) at least one polythiol bearing at least one secondary thiol group and c) at least one photoinitiator.

The photocurable composition may further comprise d) other additives different from a) to c). Examples of suitable additives d) are pigments, polymer impact modifiers, liquid crystal materials, metal powders, wetting agents, slipping agents.

More particularly said photocurable composition comprises:

10 to 80 wt % of said at least one monomer or/and oligomer a):

2 to 50 wt %, preferably from 10 to 50 wt % and more preferably from 10 to 30 wt % of said at least one polythiol b), 0.1 to 10 wt % of said at least one photo-initiator c), 0.1 to 50 wt % of said other additives d), and 0-50 wt % of at least one reactive diluent e) selected from at least one monomer copolymerisable with said at least one monomer or/and oligomer a), said reactive diluent being different from the said monomers as defined in a), with the sum of a)+b)+c)+d)+e) being 100%.

According to a preferred embodiment of the invention, in said photocurable composition said at least one monomer or/and oligomer a) is:

a1) at least one monomer or/and oligomer bearing in the same molecule at least two functional groups, with one functional group selected from a (meth)acrylate group or from a vinyl group and at least one additional (second) functional group being an allyl functional group or a2) a mixture of at least one allyl-functional monomer or/and allyl-functional oligomer and of at least one (meth)acrylate-functional or vinyl-functional monomer or/and (meth)acrylate-functional or vinyl-functional oligomer.

The term "secondary thiol" in said polytiol b), means that the —SH group is carried by a secondary carbon atom as represented here by: —CR1R2-CH(—SH)—CR1'R2'-, wherein R1, R2, R1' and R2' can be H or C1 to C2 alkyl.

The polythiol b) used in the invention has at least two secondary thiol groups and they are preferably substantially free, more preferably free of disulfide linkages. These disulfide linkages can impact the chemical and the thermal stability of the crosslinked or cured network (finished cured product) and preferably they should be avoided. The di-, tri-, and tetra-functional polythiols can be used in the present invention.

The polythiols b) can be in mixture with polythiols bearing primary —SH (thiol) groups (borne by primary carbon atoms which are in fact non-substituted carbon atoms as represented by —CH2-SH.

In the photocurable composition of the invention, said polythiol can have a functionality in —SH (secondary thiol groups) from 2 to 6 and preferably is selected from Pentaerythritol tetrakis (3-mercaptobutyrate) or from di-Pentaerythritol hexakis (3-mercaptobutyrate).

More preferably said polythiol b) is selected from Pentaerythritol tetrakis (3-mercaptobutyrate) as shown in the formula (I) below:

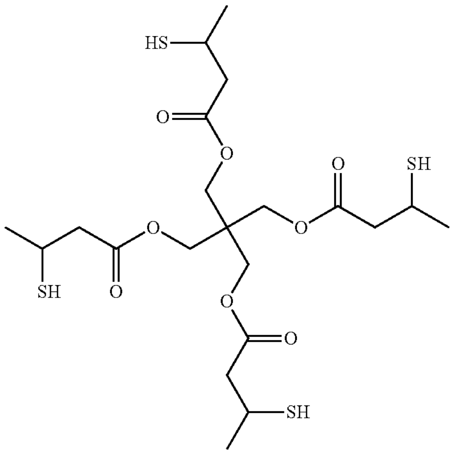 [SMILES: CC(S)CC(=O)OCC(COC(=O)CC(C)S)(COC(=O)CC(C)S)COC(=O)CC(C)S]

More particularly in the photocurable composition of the invention said oligomer a) is according to the definition a1) and is bearing at least one (meth)acrylate group and at least one allyl group.

Preferably said oligomer a1) is a urethane oligomer, and said mixture a2) is a mixture of oligomers comprising at least one urethane oligomer, preferably said mixture a2) comprises at least two urethane oligomers with one being a (meth)acrylate functional urethane oligomer and the other one being an allyl-functional urethane oligomer. More preferably said urethane oligomers a1) or in said mixture a2) is an aliphatic or cycloaliphatic urethane oligomer.

More specifically said oligomer according to a1) or according to a2) is a (meth)acrylated non-hydrogenated polydiene polyol oligomer (multi-(meth)acrylated), preferably a (meth)acrylated non-hydrogenated polydiene diol oligomer (di(meth)acrylated), bearing in the backbone (internal) cis/trans ethylenic insaturation, which is defined for the present invention as an internal allylic insaturation. Suitable non-hydrogenated polydiene on which these oligomers a1) or in a2) can be based can be homopolymers or copolymers of a diene selected from butadiene or isoprene. Consequently a polybutadiene diol di (meth)acrylate is an example of oligomer suitable according to the definition of a1) or which can be present in a2) (in mixture).

More particularly said (meth)acrylated polydiene polyol oligomer, preferably polydiene diol oligomer, is selected from the group consisting of (meth)acrylated polyols of: polybutadiene, polyisoprene and random or block copolymers of butadiene or of isoprene more preferably random or block copolymers with a comonomer selected from styrene, methylstyrene and farnesene. "Farnesene" refers to a set of six closely related chemical compounds which all are sesquiterpenes (see https://en.wikipedia.org/wiki/Sesquiterpene). α-Farnesene and β-farnesene are isomers, differing by the location of one double bond. α-Farnesene is 3,7,11-trimethyl-1,3,6,10-dodecatetraene and β-farnesene is 7,11-dimethyl-3-methylene-1,6,10-dodecatriene.

More specifically said oligomer or monomer according to a1) or as present in a2) has at least two allylic groups and optionally at least one (meth)acrylate group.

Said monomer or/and oligomer according to a1) or as present in a2) may bear alkoxy units.

Alkoxylated monomers or oligomers a1) or as present in a2), may bear from 1 to 50 preferably from 1 to 30 alkoxy units. Preferably alkoxy unit is selected from ethoxy ($—CH_2CH_2O—$) or/and propoxy ($—CH(CH_3)CH_2O—$) or/and butylenoxy (tetramethylenoxy), more preferably from ethoxy.

The composition comprises at least one photoinitiator c). The amount is less than 3 weight %, preferably less than 2 weight %. Conventional photoinitiators can be used. Suitable examples include benzophenones, hydroxyalkylphenylketones, benzoin alkyl ethers and benzyl ketals, ethyl 2,4,6-trimethylbenzoylphenyl phosphinate(TPO), 2,2-dimethoxy-2-phenyl acetophenone(IRGACURE 651). Often, mixtures of photoinitiators provide a suitable balance of properties.

To initiate photopolymerization (cure), in general a wavelength that matches the absorption wavelength of initiator is used and a high pressure mercury lamp, a medium pressure mercury lamp, a low pressure mercury lamp or an LED light source can be used for this purpose.

The photocurable composition can comprise a reactive diluent e) which is selected from the group consisting of monofunctional or multifunctional (meth)acrylates or monofunctional or multifunctional vinylic monomers, preferably multifunctional (meth)acrylates which optionally are alkoxylated. The number and chemical nature of the alkoxy units can be the same as for oligomers a1) or as present in a2): from 1 to 50 preferably from 1 to 30 alkoxy units with alkoxy unit selected from ethoxy or/and propoxy or/and butylenoxy (tetramethylenoxy), more preferably from ethoxy.

Preferred reactive diluents e) can be selected from the group consisting of: isobornyl acrylate, tetrahydrofurfuryl acrylate, phenoxyethyl acrylate, tricyclodecane dimethanol diacrylate, hexanediol diacrylate, trimethylolpropane triacrylate, trimethylolpropane trimethacrylate, dipentaerythritol hexaacrylate (DPHA). Such suitable reactive diluents are commercialized by Sartomer (Arkema) under commercial names SR506; SR285; SR339; SR833; SR238; SR351; SR350.

Said reactive diluent e) is preferably added in such an amount that the shrinkage of the cured compositions does not exceed around 7%. Suitable amounts of the reactive diluents e) can be less than about 30%, and more preferably about 10% to about 20% weight vs a)+b)+c)+d)+e).

More particularly said oligomers a1) or in a2) are multifunctional oligomers, preferably multifunctional urethane oligomers bearing at least one allylic group and at least one (meth)acrylate group, more preferably at least two allylic groups and at least one, even more preferably at least two (meth)acrylate groups.

A multifunctional urethane oligomer according to a1) or as present in a2) can be obtained by reaction of a polyisocyanate, of a polyol, and a at least two monohydroxylated end-capping agents, one of the at least two monohydroxylated end-capping agents bearing at least one allyl group and the other bearing at least one (meth)acrylate group, preferably one bearing at least two allyl groups and the other bearing at least one (meth)acrylate group more preferably at least two (meth)acrylate groups.

Examples of suitable urethane oligomers include reactive multifunctional oligomers such as CN9001, CN991, CN981, CN9101, CN1963, CN310, CN9014 and CN 9101 the last being allylic and the other being (meth)acrylated: polyester urethane acrylates, polyether urethane acrylates, allyl functional urethane, polybutadiene urethane acrylates, polyethyelene-polybutylene urethane acrylates, aliphatic or aromatic urethane acrylates.

The photocurable composition according to the present the invention, can further comprise f) 0.05 to 2% w/w with respect to the sum of a)+b)+c)+d)+e) of at least one stabilizer (also named "stabilizing agent") which is a free radical scavenger selected from hindered phenolic or hindered amine compounds. The stabilizer can be C1-C4 di-substituted phenols in alpha position vs OH or hindered cyclic amines having double substitution by C1-C4 alkyls in alpha position from the amine in the cycle, as HALS amines (Hindered amine light stabilizers) like 2,2,6,6-tetramethyl piperidine derivatives.

The photocurable composition of the invention is preferably curable by UV, LED, or visible light.

The second subject-matter of the invention relates to the use of at least one photocurable composition according to the invention, in coatings, inks, adhesives and in varnishes.

More specifically said use is for low shrinkage coatings, inks, adhesives and varnishes.

More particularly said use is for optical and electronic applications or opto-electronic applications, preferably in optical applications selected from optical lenses, optical adhesives and optical films.

Another subject-matter of the invention relates to a finished cured product, which results from the cure of at least one photocurable composition as defined above according to the invention.

More particularly said finished cured product is selected from the group consisting of coatings, inks, adhesives or varnishes.

Finally the invention covers also the use of said finished cured product for optical or electronic or opto-electronic applications. More specifically, said use is for optical applications selected from optical lenses, optical adhesives or for optical films or opto-electronic devices or sensors.

The cured composition or finished cured product exhibits excellent optical clarity, low shrinkage, flexibility, adhesion to a variety of substrate material, fast curing speed, less susceptible to oxygen inhibition.

The following examples are presented only for illustrating the present invention and its performances and consequently do not limit its covering.

Experiment

Test Methods

Pencil Hardness Measurement

Each cured film was left to stand under the condition of a temperature of 25° C., and a relative humidity of 60% for 2 hours. Subsequently, pencil hardness measurement was performed using a test pencil stipulated in JIS-S-6006 according to a method stipulated in JIS-K-5400.

Transmission Test

The transmission and haze were measured using a spectrophotometer.

Curling Evaluation Test

A sample was cut into a square shape of 100 mm×100 mm and was placed on a flat glass plate with the cured layer facing up. The distances (mm) from the glass plate to the four corners of the sample were measured, and the average of the measurements was used as the degree of curling. For a sample having a large degree of curling rolled into a tubular shape the degree of curling of such a sample is not measured (impossible to measure).

Shear Strength Test

According to ASTM D1002-10, the shear strength of different adhesive was determined. Each sample was evaluated at a tensile speed 10 mm/min using a 100N load cell. A total of 5 samples were tested at a temperature of 25° C. and a humidity of 50% for each formulation.

Storage Stability Test

Each radiation curable thiol (meth) acrylate composition are prepared by stirring all ingredients at room temperature. When mixtures were ready, the mixtures were stored for 28 days in a thermostatic drier at 60° C. Mixtures were daily checked and when a gel was observed, it was reported as "gel after×days". The viscosity of each mixtures were measured with constant shear rate 20 rpm at 25° C. The viscosity is measured using a Brookfield viscometer.

Driving Voltage Test

The adhesive solution mixed liquid crystal was placed in a conductive film, and was cured by UV-LED cured machine. The liquid crystal/polymer composite film had a thickness of 20 μm. The film was sandwiched between ITO films. The system was submitted to power transfer machine energized voltage for 1 second with the appearance of the liquid crystal/polymer composite film becoming transparent from haze.

MEK Resistance

The cured plates were fastened and tested by mar resistance machine, with Methyl ethyl ketone (MEK) double rubbing test onto to the cured coating.

Viscosity

Measured with Thermosel™ BROOKFIELD Viscometer DV-II+Pro.

Adhesion Test

Cross-cut test: a crosshatch pattern is made through the film to the substrate. Detached flakes of coating are removed by brushing with a soft brush. Pressure-sensitive tape is applied over the crosshatch cut. Tape is removed by pulling it off rapidly back over itself as close to an angle of 180°. Adhesion is assessed on a 0B to 5B scale with 0B: falling area is greater than 65% the lower performance, and 5B: no falling area with the higher performance.

Flexibility Test

The cured films were bent, the state of crease were repeated 5 times.

○: No change was observed.

Δ: Fractured by multiple times of bending.

x: Fractured by a single bending.

EXAMPLES

A curable thiol-ene composition of the present invention will be described below based on a series of Examples and Comparative Examples, although the present invention is not limited to the following examples. The amounts of various components in the following tables were expressed in parts by weight.

Table of Abbreviations

| Abbreviations of Trade Name | Description |
|---|---|
| CN9101 | Allylic functional aliphatic oligomer from Sartomer Company |
| PRO31559 | Allylic functional aliphatic oligomer from Sartomer Company |
| PRO31097 | Allylic acrylate functional aliphatic oligomer from Sartomer Company |
| CN996 | aliphatic urethane acrylate oligomer from Sartomer Company |
| TMPDE | Trimethylolpropane diallylether |
| PE1 | A mixture of 85% Pentaerythritol tetrakis(3-mercapto-propionate) and 15% Pentaerythritol tris(3-mercapto-butyrate) from Showa Denko K.K., |
| PE1AG | Trade name from Showa Denko K.K., (Pentaerythritol tetrakis(3-mercaptobutyrate) |
| PETMP | Pentaerythritol tetrakis(3-mercaptopropionate) available from SC Chemical Company |
| SR351 | Trimethylolpropane Triacrylate from Sartomer Company |
| SR350 | Trimethylolpropane Trimethacrylate from Sartomer Company |
| SR454 | Ethoxylated3 Trimethylolpropane Triacrylate from Sartomer Company |
| DPHA | Dipentaerythritol Hexaacrylate from Sartomer Company |
| Irgacure 184 | Photoinitiator from BASF |
| Irgacure TPO | Photoinitiator from BASF |

Examples 1 to 3 and Comparative 1 and 2

The composition mixed nematic liquid crystal was sandwiched between 2 ITO films and pressed and expanded to have a thickness of about 20 μm. The ITO plates with the compositions were cured at an integrated light quantity of 700 mj/cm$^2$ 1000 mw/cm$^2$ by a UV exposure machine (manufactured by Fusion H) to thereby obtain a cured film.

TABLE 1

| Composition | EX1 | EX2 | EX3 | Comparative 1 | Comparative 2 |
|---|---|---|---|---|---|
| CN9101 | 60 | | | | 60 |
| PRO31559 | | 60 | | | |
| TMPDE | | | 60 | | |
| CN996 | | | | 60 | |
| PE1AG | 30 | 30 | 30 | | |
| PETMP | | | | 30 | 30 |
| SR351 | 10 | 10 | 10 | 10 | 10 |
| Darocur 1173 | 1.0 | 1.0 | 1.0 | 1.0 | 1.0 |

TABLE 2

| | EX1 | EX2 | EX3 | Comparative 1 | Comparative 2 |
|---|---|---|---|---|---|
| Transmission | 80 | 86 | 75 | 60 | 70 |
| Haze | 7 | 5 | 10 | 15 | 13 |
| Driving voltage | 20 | 10 | 10 | >60 | 60 |
| Adhesion (ITO film) | 3B | 4B | 3B | 0B | 0B |
| Viscosity (initial) (mPa · s/cP) | 1800 | 4000 | 1000 | 1500 | 1100 |
| Viscosity (60° C. for 28 days) (mPa · s/cP) | 2200 | 5000 | 1000 | Gel after 2 days at 60° C. | Gel after 2 days at 60° C. |

Examples 1 to 3 according to the present invention with secondary —SH polythiol give more stable performance than with primary —SH polythiol.

The compositions of the present invention are stable vs comparative ones (unstable) and have remarkable optical-electronic behavior when the composition has mix phase of nematic liquid crystals. The polymer network structure makes liquid crystal to align parallel or perpendicular to the polymer surface. When an electric field is applied to overcome the interactions between polymer and liquid crystal, the refractive index of the liquid crystal matches the refractive index of the polymer, and get low haze and fast optical-electronic response optical film.

Examples 4-7 and Comparative 3 in Application of UV-LED Curing

The compositions were coated on 100 μm PET and pressed and expanded to have a thickness of about 5 μm. The PET plates with the compositions were cured at an integrated light quantity of (150~800) mJ/cm$^2$ 1000 mw/cm$^2$ by a UV LED exposure machine to thereby obtain a cured film.

TABLE 3

| Composition | EX4 | EX5 | EX6 | EX7 | Comparative 3 |
|---|---|---|---|---|---|
| DPHA | 40 | 40 | 40 | 35 | 100 |
| PRO31097 | 10 | 50 | | | |
| SR350 | | | | | |
| SR351 | 50 | 10 | 50 | 50 | |
| PE1AG | | | 10 | 15 | |
| Irgacure 184 | 1 | 1 | 1 | 1 | 1 |
| Irgacure TPO | 2 | 2 | 2 | 2 | 2 |

TABLE 4

| | EX4 | EX5 | EX6 | EX7 | Comparative 3 |
|---|---|---|---|---|---|
| Viscosity initial (mPa · s/cP) | 810 | 12000 | 380 | 480 | 7800 |
| Viscosity (80° C. 7 days) | 900 | 15000 | 420 | 520 | 7800 |
| UV dose (mJ/cm$^2$) | 800 | 700 | 500 | 250 | 800 |
| Thickness (μm) | 5 | 5 | 5 | 5 | 5 |
| Hardness | F | H | H | F | H |
| Curling (mm) | 2 | 6 | 18 | 15 | too large |
| MEK resistance (50 cycles/1 kgf) | Pass | Pass | Pass | Pass | Pass |

Conclusion

1. The curing speed of DPHA is fast in traditional UV monomers and oligomers, but it still requires 800 mJ/$cm^2$ UV dose to cure, which cannot meet end-user's cured processing (see Ex 4).

2. EX4 and EX5 show the traditional method to improve the curing speed of DPHA and anti-oxygen inhibition effect by using allylic acrylate PRO31097. However, there are no obvious differences of UV dose between them even increasing PRO31097 to 50%, and both of them have high viscosity.

3. EX4 and EX6: thiol PE1AG replace allylic acrylate PRO31097 in EX6, which lead the UV dose decrease to 500 mj/$cm^2$, therefore obviously increased the cure speed, and also dramatically decrease the viscosity in EX6 compare to EX4.

4. EX6 and EX7: the UV dose decreased from 500 mj/cm2 in EX6 to 250 mj/cm2 in EX7 by adding extra 5% thiol PE1AG, which doubled curing speed.

5. According to the results of EX6, EX7 and comparative 3 in Table 4, EX6 and EX7 showed much more performance results than comparative 3 in all aspects.

For ultra-thin coating, LED cured ink and low UV density, oxygen inhibition is limited to the surface of the materials. The term of "ultra-thin" means that the cured film has a thickness of equal to or less than 5 micrometers. The oxygen inhibition become a bulk problem as opposed to a surface issue. So the results about cured products exhibit insufficient adhesion to a substrate or insufficient hardness. Reducing oxygen from the curable materials during curing requires special condition and equipment. The present invention disclosed a composition that can observably improve anti-oxygen inhibition.

The composition is stable and has low viscosity.

Examples 8 and 9 and Comparative 4 and 5 in Application of Ultra-Low UV Density Curing The compositions were coated on ABS and nail. The thickness is about 500 μm. The nail plates were cured at 150 mJ/$cm^2$ 8 mw/$cm^2$ by a LED exposure machine to thereby obtain cured plates.

TABLE 5

| Composition | EX8 | EX9 | Comparative 4 | Comparative 5 |
|---|---|---|---|---|
| SR454 | 80 | 80 | 80 | 80 |
| DPHA | 20 | 20 | 20 | 20 |
| PE1AG | 10 | 15 | | |
| PETMP | | | | 10 |
| Irgacure 184 | 3 | 3 | 3 | 3 |
| Irgacure TPO | 2 | 2 | 2 | 2 |

TABLE 6

| | EX8 | EX9 | Comparative 4 | Comparative 5 |
|---|---|---|---|---|
| Curing speed (LED 8 mw/$cm^2$ 30 s) | ok | ok | tacky | ok |
| Scratch resistance | NG | Pass | NG | NG |
| Flexibility | Δ | ○ | x | Δ |
| Viscosity (initial) | 151.6 | 173.4 | 117.2 | 140.5 |
| Viscosity (60° C. 7 days) | 155.5 | 179.5 | 120.5 | Gel after 3 days at RT |
| Viscosity (60° C. 14 days) | 173.6 | 203.4 | 123.0 | |

TABLE 6-continued

CONCLUSION

1. EX8, EX 9 vs comparative 4, the curing speed, scratch resistance and flexibility are improved with increasing the content of PE1AG. And the heat stability is good.

2. EX8 and comparative 5, PE1 AG is more stable than PETMP.

3. The challenge is anti-oxygen inhibition and shrinkage for ultra-low UV density curing and higher thickness. The thiol PE1AG can obviously improve anti-oxygen ability and decrease shrinkage.

The curing depth in photopolymerizations is limited by reduction of ultraviolet by photoinitiator, and it is difficult to make relatively thick coating or three dimensional production especially at LED curing condition. The present invention's composition has improved depth in the photo curable materials and it is stable.

The invention claimed is:

1. A photocurable thiol-ene composition comprising:

a) 10 to 80 wt % of at least one aliphatic or cycloaliphatic urethane oligomer bearing at least one allyl-functional group or at least one aliphatic or cycloaliphatic urethane oligomer bearing at least two functional groups selected from the group consisting of (meth)acrylate-functional group, vinyl-functional group and allyl-functional group with one of said at least two functional groups being an allyl group, b) 10 to 50 wt % of at least one polythiol bearing at least one secondary thiol group, c) at least one photoinitiator, and e) at least one reactive diluent selected from the group consisting of monofunctional or multifunctional (meth) acrylates, wherein said reactive diluent is copolymerizable with.

2. The photocurable composition of claim 1 further comprising d) other additives different from a) to c).

3. The photocurable composition of claim 2, comprising:

c) 0.1 to 10 wt % of said at least one photo-initiator c), and wherein the composition further comprises d) 0.1 to 50 wt % of said other additives, with the sum of a)+b)+c)+d)+e) being 100%.

4. The photocurable composition of claim 1, wherein the composition further comprises at least one (meth)acrylate-functional oligomer.

5. The photocurable composition of claim 1, wherein said polythiol has a functionality in the secondary thiol group from 2 to 6.

6. The photocurable composition of claim 1, wherein said polythiol b) is selected from Pentaerythritol tetrakis (3-mercaptobutyrate) as shown in the formula (I) below:

(I)

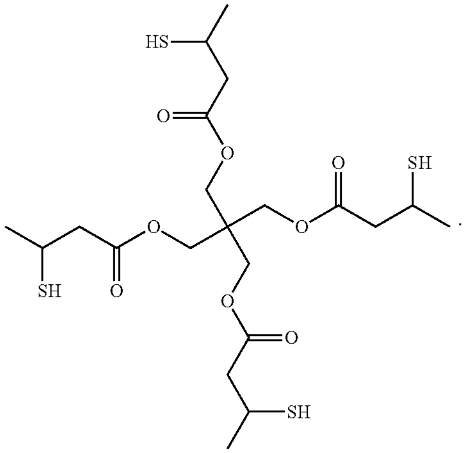

7. The photocurable composition of claim 1, wherein said urethane oligomer bears at least one (meth)acrylate group and at least one allyl group.

8. The photocurable composition claim 4, wherein said (meth)acrylate-functional oligomer is a (meth)acrylated non-hydrogenated polydiene polyol oligomer, bearing internal cis/trans ethylenic unsaturation.

9. The photocurable composition of claim 8, wherein said (meth)acrylated polydiene polyol oligomer is selected from the group consisting of (meth)acrylated polyols of: polybutadiene, polyisoprene and random or block copolymers of butadiene or of isoprene with a comonomer.

10. The photocurable composition of claim 1, wherein said urethane oligomer according to a) has at least two allylic groups.

11. The photocurable composition of claim 1, wherein said urethane oligomer according to a) bears alkoxy units.

12. The photocurable composition of claim 1, further comprising f) 0.05 to 2% w/w with respect to the sum of a)+b)+c)+d)+e) of at least one stabilizer which is a free radical scavenger selected from hindered substituted phenolic or hindered substituted amine compounds.

13. The photocurable composition of claim 1, wherein the composition is curable by UV, LED, or visible light.

14. A coating, ink, adhesive or varnish comprising at least one composition as defined according to claim 1.

15. The coating, ink, adhesive or varnish of claim 14, for use in optical applications selected from optical lenses, optical adhesives and optical films.

16. Finished cured product resulting from curing the composition as defined according to claim 1.

17. The photocurable composition of claim 8, wherein said (meth)acrylated non-hydrogenated polydiene polyol oligomer comprises a (meth)acrylated non-hydrogenated polydiene diol oligomer.

18. The photocurable composition of claim 1, wherein the composition further comprises at least one monomer bearing at least one allyl-functional group.

* * * * *